United States Patent [19]

Hawkins et al.

[11] Patent Number: 4,700,966

[45] Date of Patent: Oct. 20, 1987

[54] ANTI-JACKKNIFING CONTROL SYSTEM, APPARATUS AND METHOD

[75] Inventors: Wallace H. Hawkins, Greenville; Calvin B. Gosnell, Travelers Rest, both of S.C.

[73] Assignee: Red Arrow International Inc., S.C.

[21] Appl. No.: 847,068

[22] Filed: Apr. 1, 1986

Related U.S. Application Data

[63] Continuation-in-part of Ser. No. 758,677, Jul. 25, 1985, abandoned.

[51] Int. Cl.$^4$ .............................................. B62D 53/06
[52] U.S. Cl. .................................. 280/432; 280/446 B
[58] Field of Search ................ 280/432, 446 B, 415 B, 280/423 R, 474; 340/52 R; 403/27

[56] References Cited

U.S. PATENT DOCUMENTS

| | | | |
|---|---|---|---|
| 2,962,301 | 11/1960 | Leinbach | 280/432 |
| 3,063,739 | 11/1962 | Davies | 280/432 |
| 3,588,809 | 6/1971 | Devlin | 280/432 X |
| 3,837,678 | 9/1974 | Cicero | 280/432 |
| 3,856,329 | 12/1974 | Ordorica | 280/432 |
| 3,895,827 | 7/1975 | Padrick | 280/432 |
| 3,972,542 | 8/1976 | Dirks et al. | 280/432 |
| 4,040,006 | 8/1977 | Kimmel | 280/432 X |
| 4,556,232 | 12/1985 | Sever | 280/432 |
| 4,585,248 | 4/1986 | Miller et al. | 280/432 |

FOREIGN PATENT DOCUMENTS 960696  3/1957  Fed. Rep. of Germany ...... 280/432

Primary Examiner—John J. Love
Assistant Examiner—Charles R. Watts
Attorney, Agent, or Firm—Lynn L. Augspurger

[57] ABSTRACT

A system including an anti-jackknifing abutment apparatus (FIGS. 1-4, 7, 8) and electrical (FIG. 5) and hydraulic (FIG. 6) controls provides system control which controls limited relative angular movement between an articulated tractor 10 and trailer 20. An engagement driver in the form of cylinder 36 mounted within a rigid frame 23 is mounted by a mounting bar 25 to a forward beam member 22 of the trailer 20 for moving a abutment element 28, 128 into and out of an engagement zone within the longitudinal V-slot 17 of the fifth wheel 14. The abutment element in position on a rotational swing of the articulated vehicle is contacted by ears 18 of the V-slot, where due to the structure of the apparatus, the further rotational movement may be arrested or controlled to permit adjustment of the rotational limit of further angular movement under control of the driver. The system can be adjusted and controlled to permit adaption of the moving vehicle to various road and rig movement conditions, acting to prevent dangerous jackknifing from occurring.

51 Claims, 11 Drawing Figures

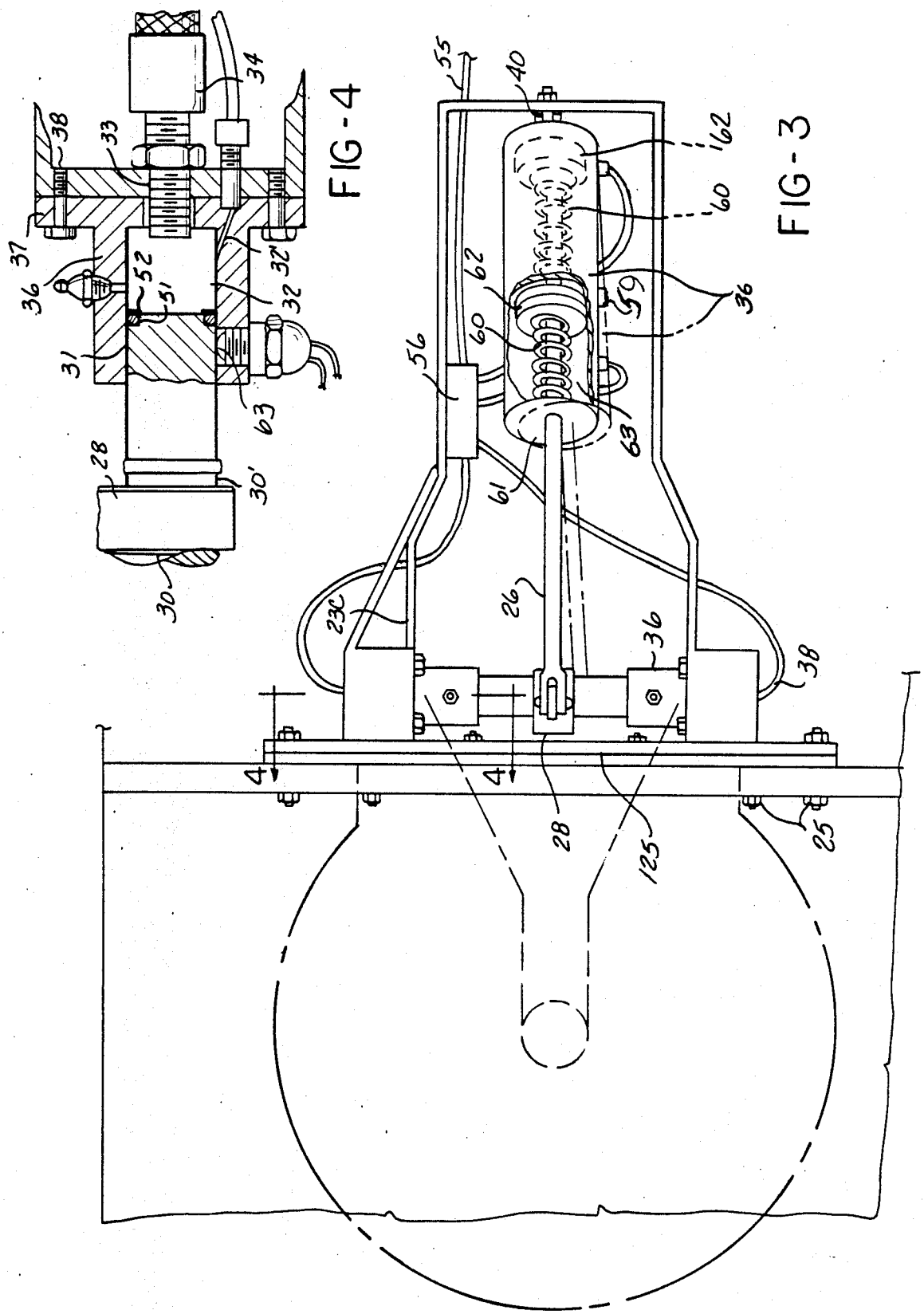

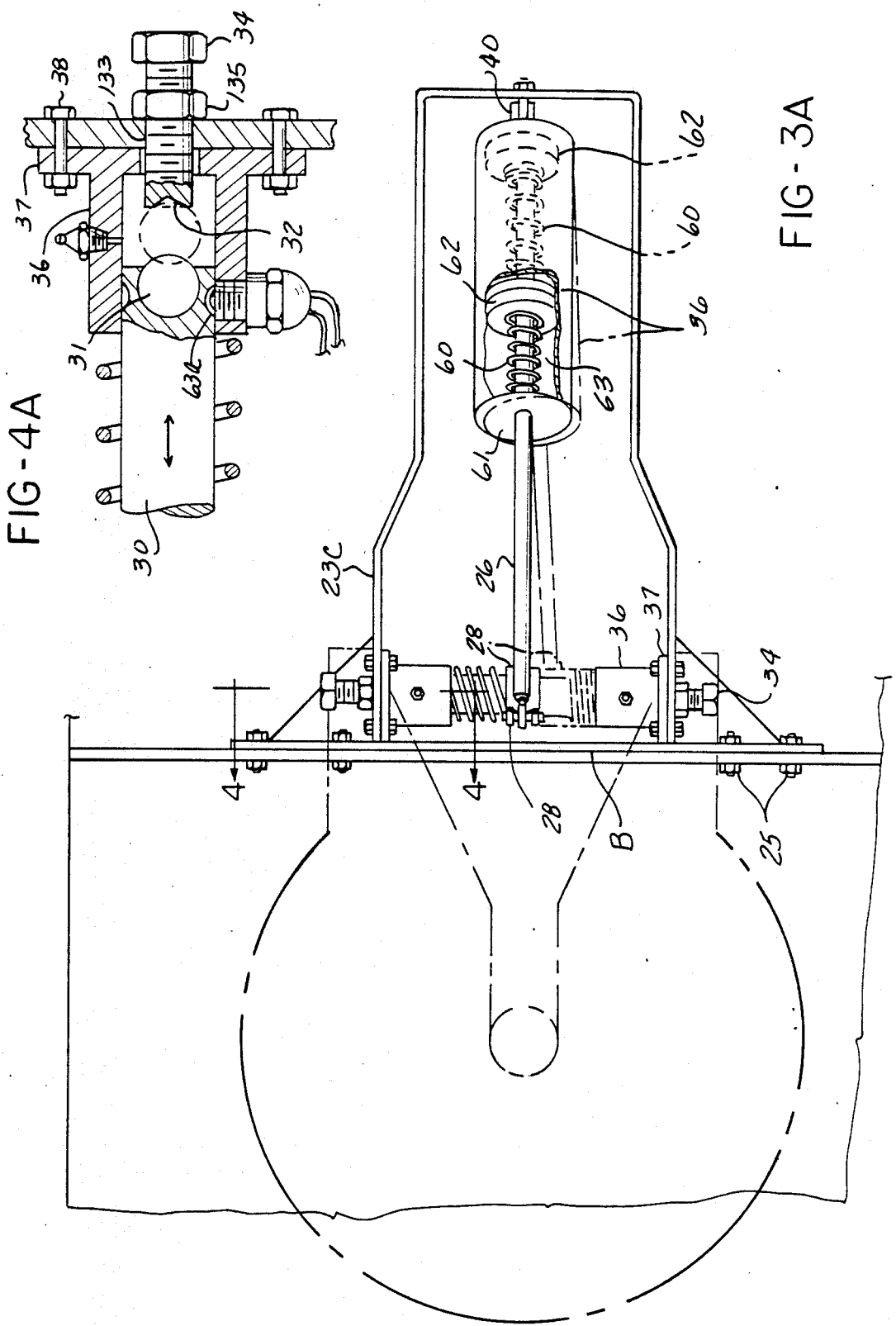

ANTI-JACKKNIFING CONTROL SYSTEM, APPARATUS AND METHOD

RELATED APPLICATIONS

This application is a continuation in part of U.S. Ser. No. 06/758,677, now abandoned, filed July 7, 1985 entitled Anti-Jackknifing Apparatus filed by the applicants, and now abandoned, in favor of the co-pending National Phase continuation-in part application U.S. Ser. No. 847,068 filed Apr. 1, 1986, based upon PCT/US 01447 filed July 11, 1986 entitled Anti-Jackknifing Control System, Apparatus and Method and continuing application U.S. Ser. No. 06/922,439 filed Oct. 23, 1986 entitled Anti-Jackknifing Apparatus, and divisional application U.S. Ser. No. 06/922,440 filed Oct. 23, 1986 also entitled Anti-Jackknifing Apparatus.

BACKGROUND OF THE INVENTION

The field of devices of the inventions are those designed for preventing jackknifing between a truck and trailer and the method of operation of the system.

Jackknifing has been ranked as the third most hazardous type of truck accident, accounting in the United States of America for approximately $20,000,000 of property damage and more than 5% of the fatal truck-trailer accidents. Safe driving practices such as keeping speed down to a safe speed for road conditions, avoidance of sudden decelerations and slippery surfaces or loose dirt, safe easy stops and smooth steering substantially improve the risk of a jackknife occurrence. Nevertheless the jackknife accident continues to occur thousands of times a year.

Trucks pull a trailer through a fifth wheel-kingpin connection which allows the tractor and trailer to pivot about the axis of this connection. The huge tractor rigs on the highway are guided by the small front tire footprint on the road. When braking, even at slow speeds, the inertia forces push at an angle against the pivot point connection and the trailer swings around pulling the tractor out of position, breaking the front tire contact, and causing a complete loss of control and a "jackknife" occurs as the trailer and tractor pivot on the kingpin connection toward each other to close like a knife blade enters the handle in a camper's jackknife. Uneven braking can trigger the phenomena, as well as side winds, sudden engine deceleration and loss of braking. The trailer can override the tractor pushing it into jackknife or the tractor can underride the trailer and cause the jackknife. These variable causes make a practical solution to the problem difficult.

This problem has long been known. It has been known for at least a decade that corrective action needs to be taken before the angle between a tractor and trailer exceeds 15 degrees. Over the years many "solutions" to this problem have been suggested. In the last decade electrical brakes were suggested as a means to reduce the jackknife occurrence, and these were employed on many trailers. However, this system did not effectively work and few vehicles use this "solution". Since 1975 so called anti-lock systems known as 121 brakes required by U.S. Federal Motor Vehicle Safety Standard 121 have been employed to automatically release brakes on an axle or tandem if any wheel locks up more than momentarily. Still sudden brake applications can cause wheel lock-up. Hand valves to cause trailer wheels to lock to prevent jackknifes have been proposed, but the U.S. National Safety Council found this solution could actually induce trailer jackknifes. Drivers who over-accelerate in a effort to pull out of such an induced jackknife may induce a tractor jackknife by spin-out.

While there are only six fundamental machines the field of mechanisms and structures may be unlimited. However, in this art here have been numerous suggestions in prior art attempts. An effective solution needs to be cost effective and safe and reliable. The many prior art devices suggested by the patent literature are not seen on the vehicles on the road today and jackknife accidents continue to occur. If an effective solution had been achieved, in view of the clear need, one of the prior art devices should have been adopted widely prior to this time. With such a number of prior devices available, without the use of hindsight, a description of relevant background prior art applicable to the present invention would not be readily apparent. In the prior art there does exist many attempts to limit the amount of pivotal movement of the fifth wheel and kingpin of a tractor-semitrailer combination and other various arrangements to prevent or minimize the tendencies of tractor-trailers to jackknife. However, these arrangements do not provide apparatus which are adjustable to road conditions as does the present apparatus and they do not provide a control system for continuous monitoring of an anti-jackknifing apparatus which limits swing to a anti-jackknifing controlling arc and which allow the driver to control the vehicle and control apparatus in accordance with varying road conditions and rig movement and which has the other features which will be described. A representative sample of the prior art granted over many years may be listed as follows:

U.S. Pat. No. 2,462,211, filed Feb. 24, 1947 to C. L. Moore

U.S. Pat. No. 2,553,959, issued May 22, 1951 to H. F. Cook et al.

U.S. Pat. No. 2,652,262, filed Oct. 19, 1950 to W. G. Sherry

U.S. Pat. No. 2,962,301, filed Oct. 15, 1959 and issued November, 1960 to W. J. Leinbach W. Ger. Pat. No. 960,696 issued Mar. 7, 1957 naming Hans Becker as inventor U.S. Pat. No. 3,031,205, issued Apr. 24, 1962 to P. Fox U.S. Pat. No. 3,063,739, issued Nov. 13, 1962 to P. M. Davies U.S. Pat. No. 3,420,548, filed Oct. 7, 1966 to C. M Wakeman U.S. Pat. No. 3,588,809, issued June 28, 1971 to A. S. Devlin U.S. Pat. No. 3,774,941, filed Feb. 14, 1972 to H. H. Durr U.S. Pat. No. 3,837,678, filed May 3, 1973 and issued September, 1974 to R. Cicero U.S. Pat. No. 3,856,329, issued Dec. 24, 1974 to M. A. Ordorica U.S. Pat. No. 3,895,827, issued July 22, 1975 to J. D. Padrick U.S. Pat. No. 3,972,542, issued Aug. 3, 1976 to Arthur A. Dirks U.S. Pat. No. 4,040,006, issued Aug. 2, 1977 to R. W. Kimmel U.S. Pat. No. 4,068,860, issued Jan. 17, 1978 to A. Dirks and W. Meyers U.S. Pat. No. 4,556,232 issued Dec. 3, 1985 to J. I. Sever Such a hindsight collection of patents can be developed after a review of the inventions herein. Prior art warning devices exist which warn drives of an oncoming jackknife, and which indicate fishtailing, principally relating to vehicles which do not employ a fifth wheel. A number of recognized prior art inventions recognized by their patents have disclosed the positioning of a device, such as a block or abutment member, within guide lugs in the entranceway or V-slot of the slide plate of a fifth wheel mounted on the tractor to prevent jackknifing. However, these inventions have not been widely adopted. Representative examples include U.S. Pat. Nos. 2,553,959; 2,962,301; 3,972,542 and 4,068,860. In the U.S. Patents to Dirks et al., this concept was employed and implemented by a generally horizontal longitudinally extending restraining tongue rigidly mounted on the trailer underside and terminating as a forward tapered tongue tip (or bracket) between the lugs in an extended station position. A remotely controlled cylinder attached to the tongue caused horizontal tongue reciptocation between the retracted and forward extending position to prevent jackknifes. After a review of the detailed description below it will be appreciated that none of the prior art attempts accomplish the results of the present inventions as detailed in the description.

SUMMARY OF THE INVENTIONS

The present control system functions in accordance with the described preferred embodiments of the present inventions normally in a position of actual or potential engagement with the fifth wheel and acts as an anti-jackknife control system and warning device which allows the driver to set the limits of swing of the trailer while driving in accordance with road conditions and rig movement. The present system allows the drive to set the control system by a control method implementing the functions of the apparatus. The control system provides for permissible swings of the articulated vehicles about a full swing arc, about a limited controlled arc lesser than the full swing, and free within a limited arc lesser than the controlled arc under supervision of a position control system. As such a jackknife is not permitted to occur when the control system is engaged, for system-fifth wheel engagement prevents rotation to the extent that a jackknife could occur. Instead, the system control the swing allowing the driver to continue to drive the vehicle and in the event a sever limit is reached the system causes the tractor to move into a controlled plow which averts the jackknife accident.

In accordance with the preferred embodiments of the inventions the apparatus is easily mounted on the trailer bed frame by bolting a control system frame to one of the horizontal trailer bed frame beam members. This mounting locates a pivotal engaging bar limit element which pivotally flips into and out of an engagement zone position between the ears of a tractor's conventional fifth wheel the under control of a switch accessible to the driver. The control system enables the position of the engaging bar limit element in the engagement zone to limit the trailer to approximately 12 to 14 (nominally 15) degrees of swing about a kin pin pivot point from the normal linear alignment of the tractor trailer, as well as swing through a wider controlled swing radius. Normally when the trailer turns it pivots completely around on the fifth wheel. When the limit element of the anti-jackknife control system is engaged, the hitch turns about 15 degrees in free swing before the fifth wheel contacts the engaging bar. At this point the trailer can proceed to swing an additional 10 to 15 degrees in the same direction up to an end limit (preferred to be at 26 degrees). At the start of the additional swing an alarm sounds in the cab. This alarm tells the driver that the trailer is swinging towards the limit of turn and warns him that the transition point from permitted free swing is passed. At this point, the operator has the option of releasing the limit bar and by flipping a control switch inside the cab which releases the fifth wheel for free rotation, allowing full pivoting action of the fifth wheel, or he can leave the limit bar element in position and the limit bar element will continue to move sideways to the point of limit of lateral movement fixed by normal setting to a 10 to 14 degree additional swing limit the tractor trailer movement, or to another angular (lateral) limit set by the driver. During this period of additional swing further lateral movement of the limit member is slowed (unless stopped by the driver), and a potential jackknife can be controlled by the driver who has been warned to steer in the direction that the rear of the trailer is sliding. If the tractor is sliding, the driver will steer in the direction that the rear of the tractor is sliding.

When the limit element is in place, its fifth wheel control system interaction prevents further relative angular movement by the position of the limit element in a laterally stopped position, so that the tires of the tractor will plow sideways at an angle and the truck remains under control plowing down off of the tires like a plow. Tire plow will bring the rig to a halt, but the danger of turn over and jackknife has been prevented.

In accordance with the invention, in operation the engaging bar limit element is to be normally in position between the ears of the fifth wheel. After coupling of the kingpin in the center of the fifth wheel V-slot the driver engages the engaging bar and the control system and limit element is engaged. The unit is adjustable to reasonable positions for speed, as it is in order to accomodate twisting mountain roads, (lower speeds permit a greater degree of swing without interial conditions causing a jackknife occurrence), between end limits of movement. These end limits of movement may be set by the driver before or after a time when the ears move the abutment limit element into the warning zone. Mechanically the system is designed so the the limit setting will be between an end limit of approximately 15 degrees to a total limit of a preferred 26 degrees (30 is the maximum range). Free swing between 12 and 16 degrees is permitted as being the the normal approximate 15 degree swing in either direction permitted before the anti-jackknife warning control signal is made noticeable. In the engaged position the unit feeds back to the driver the relative tractor position with the cab mounted control panel which contains the warning lights and audio alarm system, which, even when trailer angle is not being limited by throwing an auxiliary switch, serves as a safety feedback device notifying the driver that the trailer is moving toward its limits and approaching a position where it could jackknife if the system was not employed.

This warning condition would occur should the driver momentarily doze and the truck becomes unstable, waking him and indicating corrective action when the engagement bar is in its normal active position. The driver can react to the warning. The bar can be disengaged by flipping the control and/or limit switch on a control panel on or off. When it is not needed and when the truck is under control, such as when the rig is going through city streets, pulling into filling stations and onto freeway ramps or backing to a loading dock the control switch may be switched off to disengage the bar control. Thus disengaged the control device allows the truck to negotiate such as easily as if the unit were not in place.

In situations where when the engagement bar limit element is disengaged when the rig would reach an unstable condition, as when it went off onto the berm, switching on the control system would cause the engagement bar to move the limit element into position centered initially and then be permitted to move to the limit set by the driver where it is held until the rig has traction.

The engaging bar of the control device in the present system is controlled by a panel control monitor, providing feedback to the driver as to the status of the engaging bar's position, whether it is engaged or not, and whether the relative movement is within or beyond normal free range. This panel signals the driver to engage the system if it is not but should be engaged. A fail-safe disengagement system is provided to prevent possibly dangerous feedback in the event of control failure.

The foregoing overview of the functions of the system is implemented in a system control apparatus which can be installed on new and existing trailer vehicles. This control of a constantly moving rig is achieved by an apparatus which is composed of a few elements which are rugged and reliable, with minimal maintainence requirement and which are protected from damage of impact or weather conditions. The system is implemented by elements whose interaction can best be understood by reference to the particular elements of the structures described for the preferred and alternate embodiments of the inventions, which will be described in detail with reference to the accompanying drawings in which:

FIG. 1 is a view in elevation illustrating the locations of the anti-jackknifing control apparatus of system constucted in accordance with the preferred embodiment of the present invention.

FIG. 2 is a schematic perspective view of the control apparatus illustrated in FIG. 1 looking downwardly from the trailer illustrating the anti-jackknifing abutment engaging bar and limit element in engagement position between the ear portion of the fifth wheel's slide plate; and FIG. 2A is a schematic perspective view of the control apparatus of FIG. 1A looking downwardly from the trailer illustrating an alternate embodiment of the anti-jackknifing apparatus; and FIG. 3 is a plan view looking upwardly beneath the fifth wheel (illustrated in phantom) of the anti-jackknifing control apparatus as it enters the engagement position.

FIG. 3A is a similar plan view looking upwardly beneath the fifth wheel (illustrated in phantom) of the alternate embodiment of FIG. 2A in the engagement position.

FIG. 4 is a sectional elevation taken on the line 4—4 in FIG. 3.

FIG. 4A is a sectional elevation taken on line 4—4 of FIG. 3A.

DESCRIPTION OF THE PREFERRED EMBODIMENTS

Figure 1:
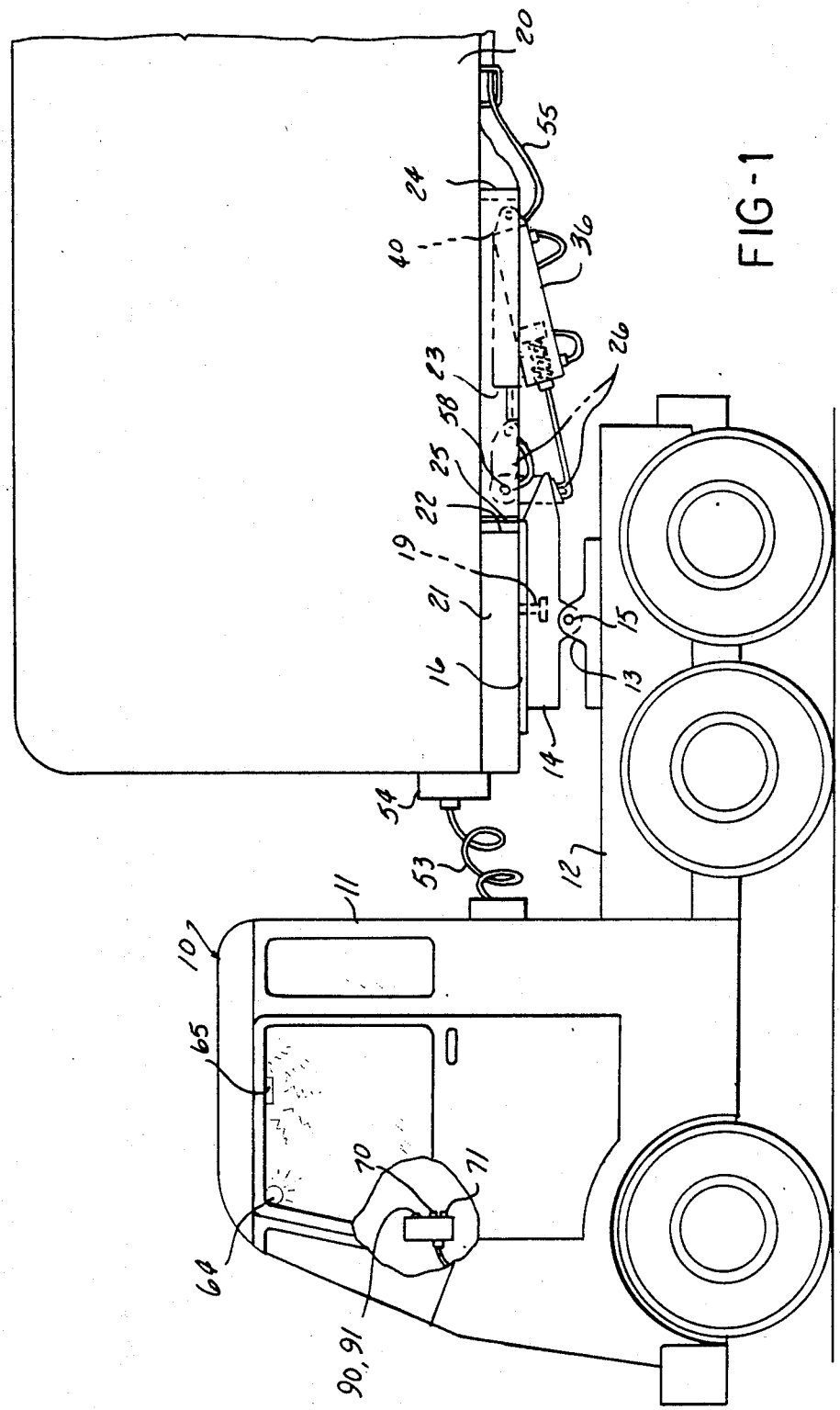
Figure 2:
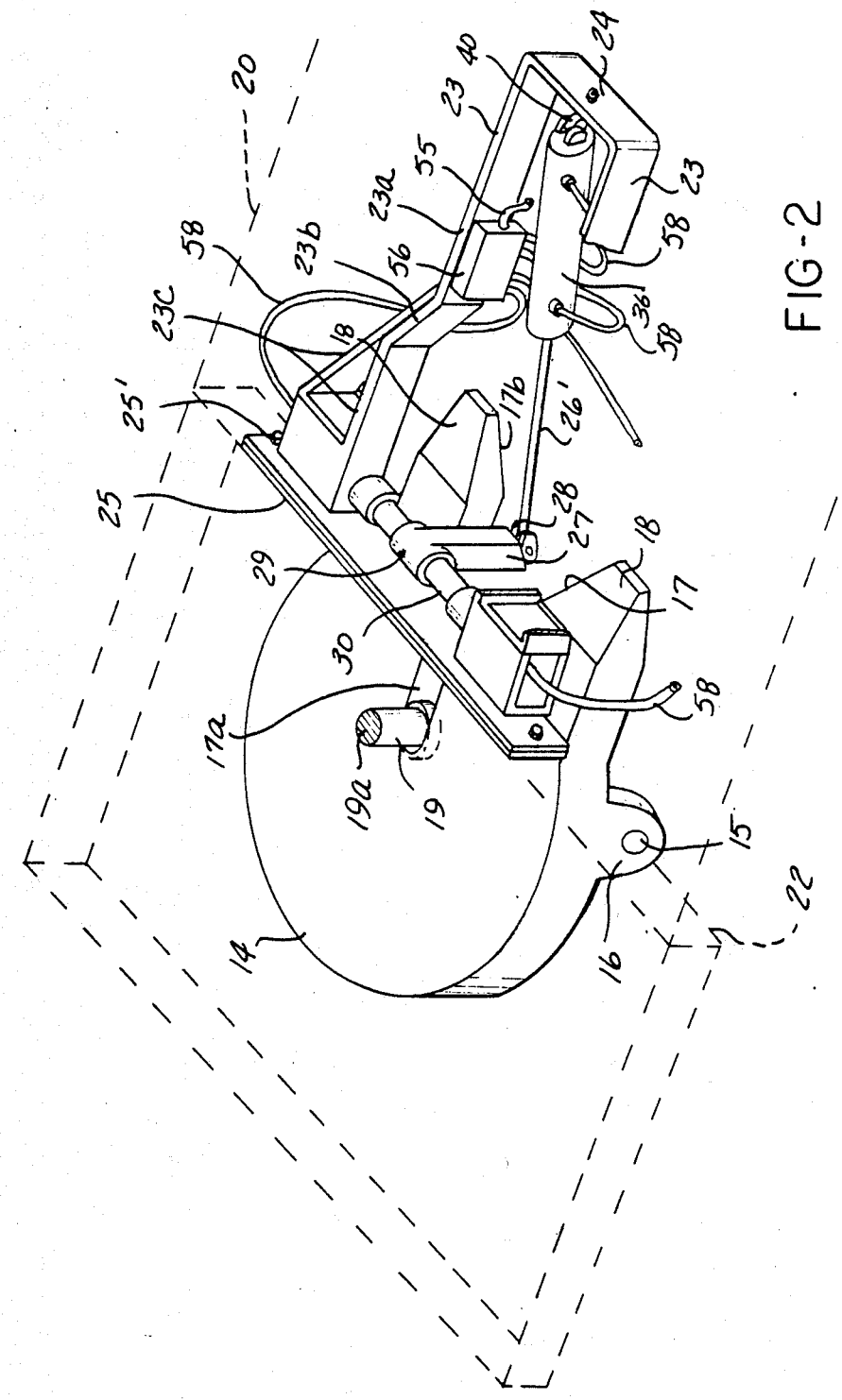
Figure 2A:
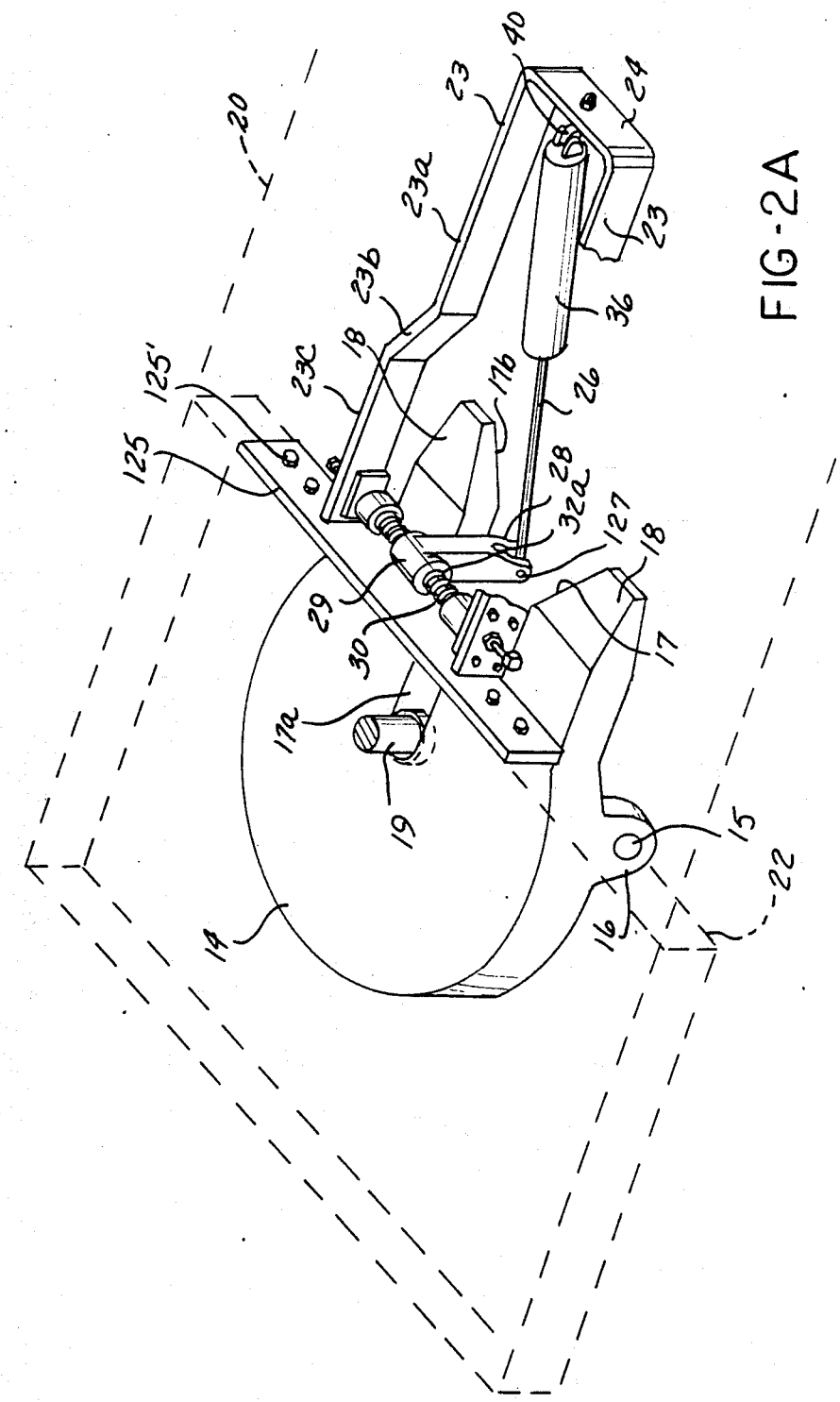
Figure 6:
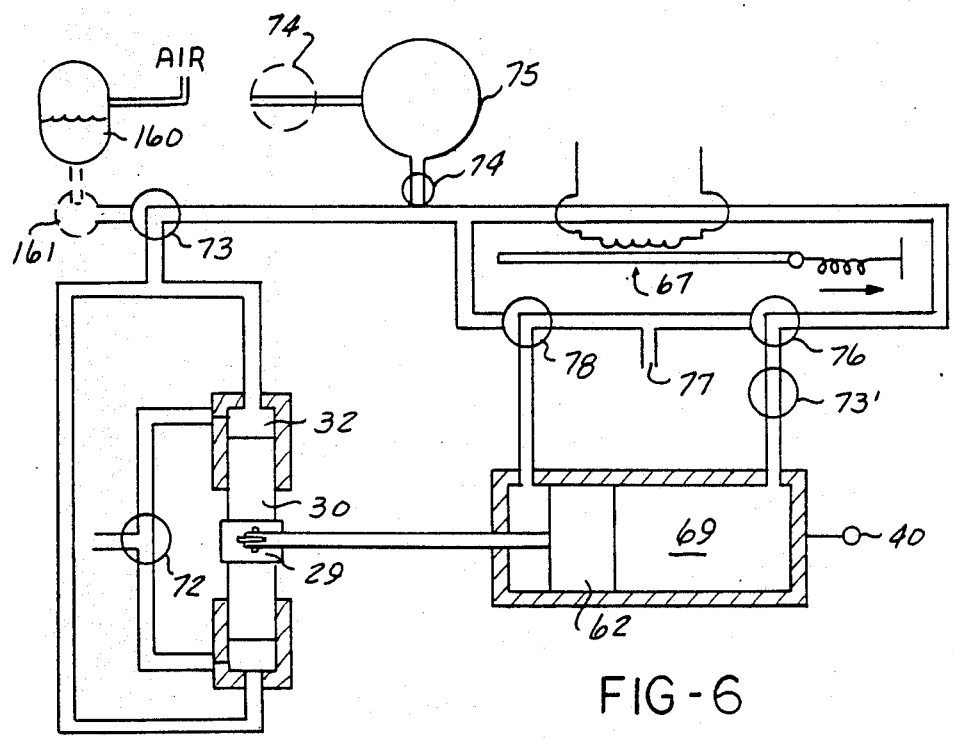
FIG. 6 is a schematic fluid control diagram.
Figure 7:
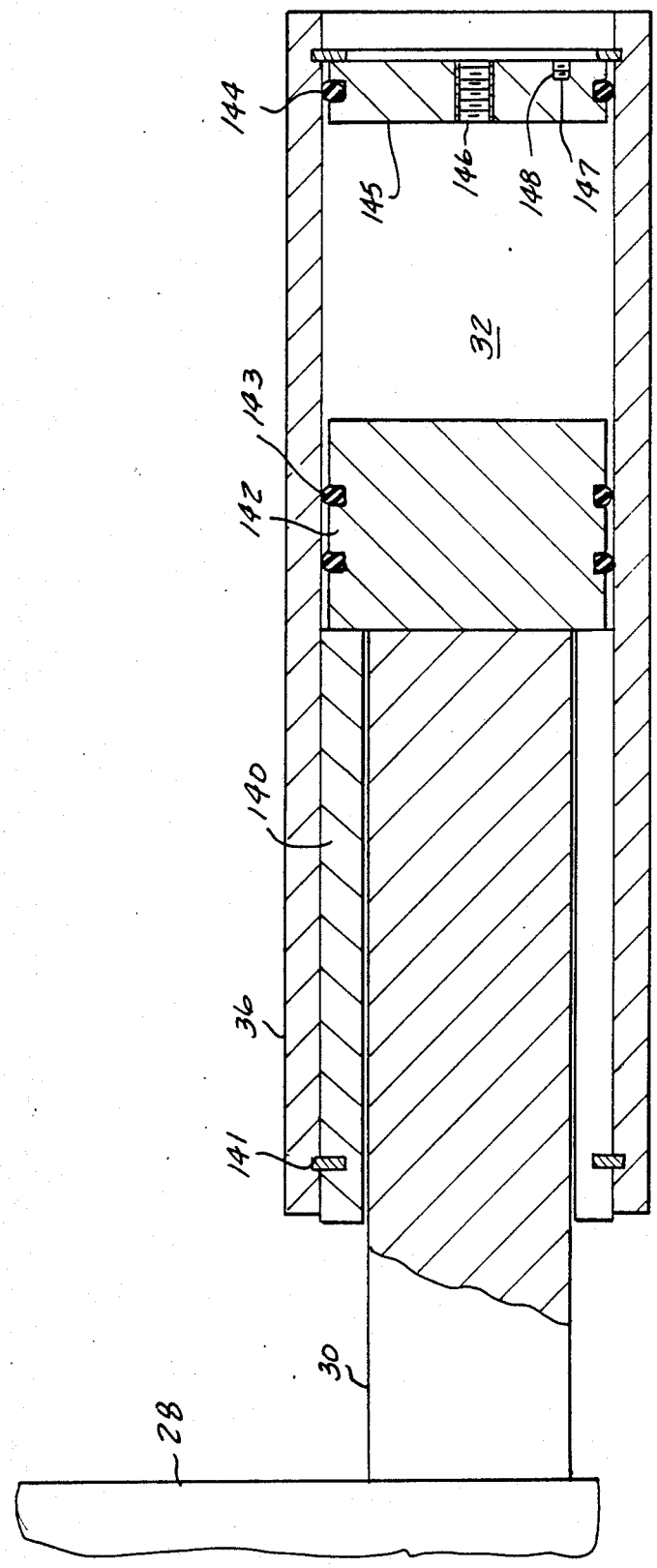
FIG. 7 is a schematic sectional view of the preferred engaging bar shaft housing taken along the line 4—4 in FIG. 8 is a perspective view of a modified anti-jackknifing apparatus.
Figure 8:
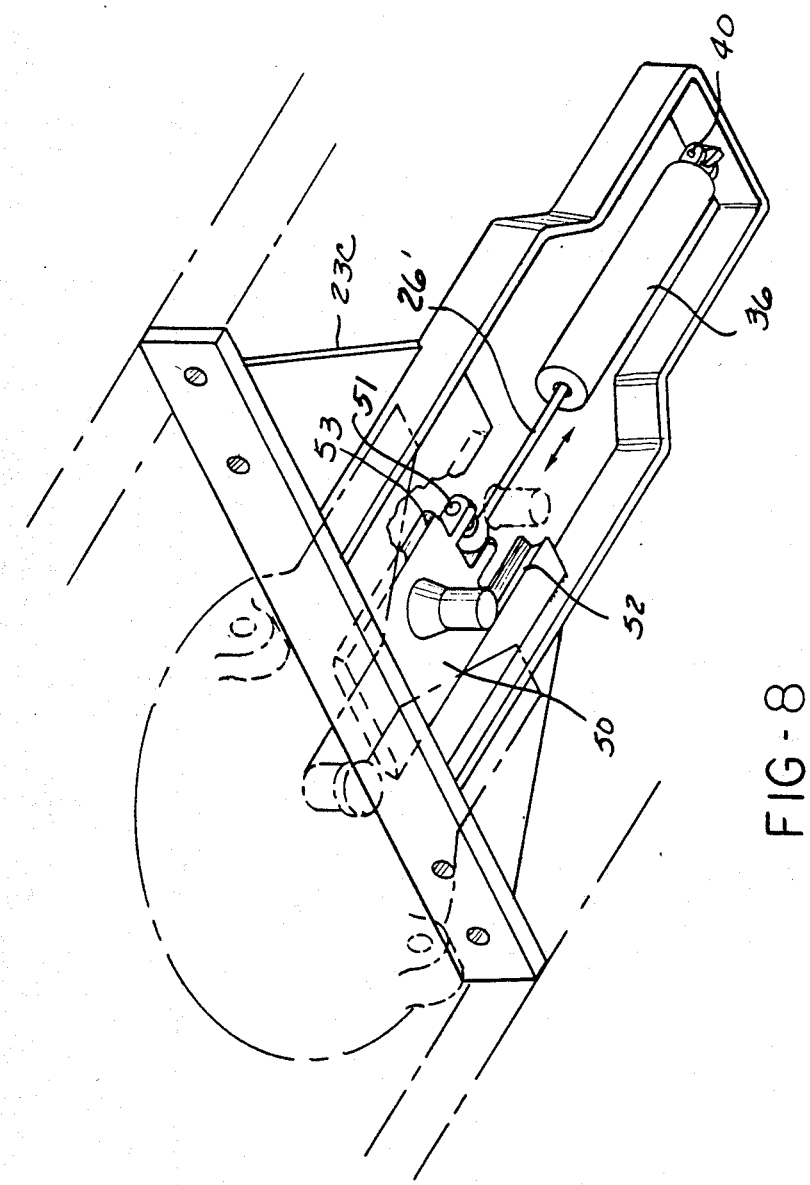

Turning now to the drawings in greater detail, the preferred embodiment of the invention is illustrated in FIGS. 1–7, while alternate embodiments are shown in FIGS. 2A, 3A, 4A and a modified embodiment illustrated in FIG. 8. All embodiments are carried on a tractor-trailer rig illustrated generally in FIG. 1.

A tractor 10 and a trailer 20 make up two intercoupled articulated vehicles, what is often called a rig, a tractor trailer coupled through a fifth wheel slide plate 14 of the tractor. For the purpose of illustration the tractor 10 of FIG. 1 has a cab 11 and a bed or platform 12 having mounted thereon a conventional fifth wheel assembly 13, 14, 15, including a disc shaped slide plate 14 pivotally secured at both sides thereof by a fifth wheel journal mount 15 to brackets 13 which are fixedly secured to the platform or bed of the tractor 10.

The trailer 20 is coupled to the fifth wheel assembly by a kingpin 19 which projects rigidly downwardly from the bolster baseplate 16 underlying the mainframe or underframe 21 of the trailer 20, and generally crossing two or more cross frame beam members 22 of the mainframe 21. As the tractor or truck 10 is backed beneath the trailer 20 the bolsterplate 16 contacts the slanting slide plate surface of the fifth wheel and the kingpin 19 enters V-slot 17 (FIG. 2) of the slide plate 14. The V-slot of the preferred embodiments is a conventional V-slot having therein a relatively straight longitudinal portion 17a and a diverging portion 17b forming the angular V-slot and defining the ear portions 18.

As shown in FIG. 2 and FIG. 2A this V-slot 17 acts as a guide for the kingpin coupling. In the present inventions these V-slot ears act as a feedback mechanism input for the control of the articulation of the vehicles. This coupling of the tractor trailer is the conventional interconnection of the tractor with the trailer. The kingpin is usually clamped in the center of the disc slide plate 14 by a locking mechanism. There the kingpin is able to rotate about the vertical axis 19a of the kingpin as the trailer moves angularly relative to the tractor.

The control apparatus of the preferred embodiment of the inventions, as illustrated in FIGS. 1, 2, 7 and 2A is preferably mounted beneath the trailer. A cross frame beam 22 is located above and crossing the position of the V-slot 17 when the tractor is coupled to the trailer. Above this V-slot position a mounting bar 25 is positioned. Lugs or bolts 25' secure the mounting bar 25 to the crossframe beam 22 of the trailer. In some trailers when mounting the control apparatus after trailer manufacture it is necessary to remove a cross frame member, or to cut out a section thereof. Sometime the bolster plate 16 extends rearwardly of the kingpin a distance which exceeds the distance of rearward ear extension of the slide plate 14, in which case the bolster plate has to be partially removed or an aperture cut therein to accommodate the control apparatus.

The anti-jackknife control apparatus comprises an anti-jackknife apparatus mounted beneath the trailer and the system controls which are illustrated and described herein.

The present apparatus is easily mounted on the trailer bed frame by bolting a control system support frame 23 to one of the horizontal trailer bed frame 21 beam members 22 to which the mounting bar 25 is attached. In the preferred embodiment the mounting bar 25 is a bar with projecting studs which is welded to the frame with the studs projecting rearwardly, and the support frame is placed with the studs projecting through beveled apertures in the front portion of the support frame 23, where lugs 25' lock the support frame tightly on the mounting bar. In an alternate embodiment shown in FIG. 2A the mounting bar 125 is part of the support frame which is bolted to the frame by bolts 125'.

In the preferred embodiments the support frame 23 is horizontally and longitudinally mounted. Generally it may be considered substantially rectangular; however, as seen from the drawings the front engagement bar bracing section is wider than the rear cylinder mounting section of the support frame. This frame portion has side members 24 which extend around the control apparatus and protect it. The sides have rear portions 23a and outwardly flaring portions 23b as well as forwardly aligned bracing portions 23c and a front mounting bar 25, 125.

The support frame when mounted within the protective bed frame 21 of the trailer surrounds the control apparatus and protects it from above, from the side, and from below. The mounting bar section and side of the frame is wide enough that the slide bar won't accidently penetrate the protecting frame as it is protected by the bolster plate and wide enough to slide up on the plate itself. As will be understood, when disconnected from fluid, the engagement bar 29 limit element member 28 will be retracted protecting it and the fluid operated cylinder 26 from damage. The forward limit member 28 may have a bifrucated end portion 127 or preferably the end of the piston rod 26 may be bifrucated to pivotally connect to the abutment means limit element link 28.

In the preferred embodiment the movable members of the control apparatus are the engagement bar elements indicated generally at 29 with their abutment limit element member 28 mounted thereon, is moveable into and out of engagement position between the ear portions of the V-slot 17 by the extensible piston rod member 26' of the fluid actuation cylinder 26. It will be understood that the support frame when horizontally mounted underneath the trailer bed locates the engagement bar elements 29 in a position generally above the V-slot. The shaft 30 of the engagement bar elements 29 is journaled in a pair of lateral support housings 36. The lateral orientation of the engagement bar elements 29 in relation to the support frame and thus to the frame of the trailer and V-slot of the fifth wheel is determined such that the limit member 28 may be pivotally moved by shaft 30 rotation caused by linear movement of said extensible piston rod member 26' connected thereto by abutment pivot connection 27 down into position in the engagement zone within the V-slot. There the ear portions of the slide plate 14 may contact the limit member 28.

In the preferred embodiments the rotatable shaft 30 is journaled so as to permit lateral (linear) movement in the shaft housing. Also in the preferred embodiments of the invention rotatable shaft 30 includes a bushing which is an integral casting with the link of the limit element 28 (or element 28 may be welded thereon) so as to form a pivotal engaging bar limit element which pivotally rotates into and out of an engagement position between the ears of a tractor's conventional fifth wheel the under control of a master control switch 70 on control monitor panel 68 accessible to the driver in the cab 11. The position of the engaging bar limit element 28 in the engagement zone normally limits the trailer to 12 to 16 degrees (nominally 15) of free articulation or swing to either side about a kinpin pivot axis point 19a from the normal linear alignment of the tractor trailer before a warning beeper or horn 65 sounds. The ultimate lateral linear movement of shaft 30 may be set so as to be stopped by an limit stop 133 set by lock nut 135 in FIG. 2A (or by nipple 33 in FIG. 2) so that the angular relative swing about axis 19' from a line interconecting the front of the tractor and rear of the trailer will not be more than approximately 26 to 30 degrees in either direction allowing for a normal 15 (or 12 or 16) degree swing, plus an additional preferred 10 or 14 degrees. Normally, when the trailer turns it pivots completely around on the fifth wheel. When the limit element of the anti-jackknife control system is engaged and the hitch turns "15" degrees the hitch ear portion 18 contacts the engaging bar limit element 28. At this point the ear 18 drives the abutment limit element 28 linearly in the housing in the direction of its own travel and the trailer can proceed to swing an additional amount in the same direction (up to the preferred limit of 26 degrees). But, shortly after the start of this additional lateral movement occurs, an alarm sounds in the cab. This alarm 65, which may include a flashing light 64, tells the driver that the trailer is swinging in engagement toward its 26 (up to 30) degree limit.

At this point, the operator has the option of releasing the limit bar 28 by flipping the control switch 70 inside the cab which releases the fifth wheel for rotation by causing retraction of the piston rod of cylinder 26 allowing full pivoting action of the fifth wheel, or he can leave the limit bar element in position in the engagement zone of the V-slot 17 and the limit bar element will continue to slide laterally. As it moves sideways the fluid in chamber 32 will cushion and retard further lateral swinging movement as the chamber bleed orifice 32' (a 60/1000ths drilled line) will allow the further lateral swing. This provides the driver an additional 10 degrees of swinging movement and time to react to the signal. This also allows the element 28 to be released from engagement with the fifth wheel ear.

At any point the lateral movement of the abutment whether while being driven sideways by the ear or in the center position where the limit element is normally initially placed, the point of actual limit of lateral movement may be placed, the point of actual limit of lateral movement may be fixed by the driver. Further swing movement from the 15 or 16 degree danger point of articulation of the tractor trailer movement which causes more lateral traverse of the shaft 30 in the housing 36 may be adjustably set under control of the driver by throwing the limit switch 71 in the cab. In function limit switch 71 causes a check valve actuator (not shown) to close the dash pot chamber checkvalves 72 and 73 in the hydraulic system and limit expression of fluid from the dash pot fluid pressure and compression chamber 32 of housing 36. This acts to freeze the lateral shaft movement to one allowed solely by the centered position of the abutment limit element, or to another angular (lateral) limit where is is driven by the ear 18 of the slide plate 14 as set under control of the driver at the time he activates limit switch 71. When the dash pot is frozen only further compression of fluid between the shaft 30 and the check valves 72 and 73 is possible. This provides little lateral movement.

During the period when the shaft is sliding laterally in the housing and compressing the fluid, the audible horn or speaker 65 warns the driver to steer in the direction that the rear of the trailer is sliding. If the tractor is sliding, the driver understanding the feel of the tractor movement and alerted by the signal will steer in the direction that the rear of the tractor is sliding.

When the limit element is in place in the engagement zone in the V-slot 17 of the slide plate 14 the engaging abutment of the engaging bar and the ears 18 of the slide plate of the fifth wheel control system interaction. When the engaging bar is locked in the center position it prevents further relative angular movement greater than about 15 degrees by maintaining the fixed position of the limit element in a laterally stopped position, and the tires of the tractor will move at an angle and plow sideways as the Tire plow will bring the rig to a halt, but the danger of turn over and jackknife has been prevented.

If the potential danger is due to a curve on mountainous terrain and no jackknife is probable driver judgment will control the limit by the setting made when the driver throws switch 71.

Figure 5:
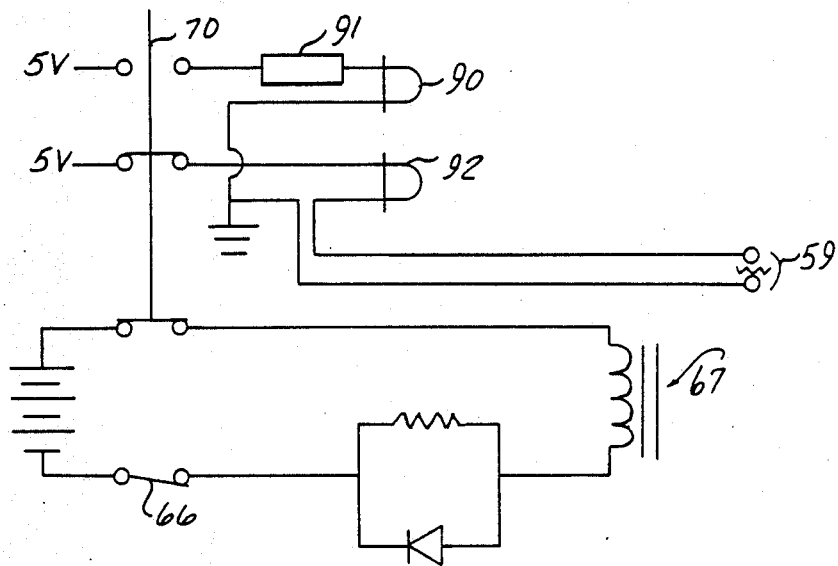
FIG. 5 is a schematic circuit diagram of electrical elements of the control panel.

The engaging bar limit element is retracted when the trailer is disconnected or when the control switch 70 is thrown to the disconnect position (up to the flasher pole in FIG. 5). The engaging bar is advanced by rotation of the shaft and link element 28 into the engagement position in position with the abutment limit element 28 in position between the ears of the fifth wheel by the action of the cylinder. When initially thrown the hydraulic system is powered to causes the shaft 30 which carries link element 28 to be centered between the housings 36. At this time the check valves 72 and 73 are open and equalized pressure exists in the dash pot fail-safe chambers 32, acting to center the shaft therebetween.

Because of the ability to allow a variable overrun of the normal abutment position by throwing the variable check valve switch 71 only after the shaft has been moved sideways, the unit is adjustable to reasonable positions for speed, and to accomodate twisting mountain roads, (lower speeds permit a greater degree of swing without interial conditions causing a jackknife occurrence), between settable end limits of movement. The ultimate limit of movement beyond the 15 degree warning mark are usually set to an end limit of 26 degrees. However, even though the ear engages the abutment, throwing the check valve limit switch on and the control switch off allows retraction to allow free rotation.

Normally the system should be engaged to permit the warning system to function. This warning condition would occur should the driver momentarily doze and the truck becomes unstable, waking him and indicating corrective action (which can include throwing the switch 71 and steering in the direction indicated by the audio system).

When the driver is going over ice and snow, he can vary the limit of the amount of swing by turning on the extra limit switch 71 and hold the shaft at a specific point until he has traction and then may turn off this fluid lock and allow free swing of the tractor trailer.

The engagement bar 29 bar can be disengaged by flipping the switch 70 on the control panel in cab 11 when it is not needed and when the truck is under control, such as when the rig is going through city streets, pulling into filling stations and onto freeway ramps or backing to a loading dock. In order to disengage the control engagement bar is rotated by cylinder 26 retraction (under spring 60 bias, or preferably by air retraction bias caused when the control switch 70 is thrown, or a combination thereof) of the extensible member 26' rotating the link on which limit element 28 is fixed to allow the truck to negotiate such as easily as if the unit were not in place.

When control switch 70 is thrown off, the switch is effectively moved up to the poles of the flasher signal light emitting diode 90 for the control monitor panel as shown in FIG. 5. This flashing LED is flashed by a flasher control element 91, such as the flip-flop LED flasher chip of National Semiconductor LM3903. This warning light may be yellow warning the driver to turn on the control system by throwing the switch 70 down. Thus engaged the switch 70 will activate cylinder solenoid valve system to move the engaging bar into position, as well as activate green operating signal, LED 92, on the control monitor when the piston of the cylinder causes the contact switch 63 to close.

In situations where when the engagement bar limit element is disengaged when the rig would reach an unstable condition, as when it went off onto the berm, switching on the control system immediately causes the engagement bar to move the limit element into a centered position initially and then moved to the limit set by switch 71 where it is held until you have traction. Most of the time the driver will throw both switches at the same time. Accordingly, they are located together on the panel 68.

The engagement bar 29,30 has a shaft section which is journaled in housing 36. In the mode of the preferred embodiment of the invention illustrated by FIG. 4 a sealing ring 52 at each housing end is provided to position a O-Ring gasket 51 at the end and yet allow some fluid space to be maintained at the end of the chamber 32. Another O-ring gasket is provided on the shaft adjacent the bushing 36. A grease fitting is provided to allow introduction of grease so that the shaft can slide in housing 36 on a grease film, as shown in FIG. 4.

In the best mode of the preferred embodiment the amount of fluid in this damping chamber may be fixed by closure of the normally open solenoid actuated dash pot check valve 73 and bleed control check valve 72 shown in FIG. 6 by switch 71. This switch locks fluid in the chamber 32 and allows no movement therefrom thus limiting with a fluid the further sliding movement of the shaft 30 toward the limit end 37 of housing 36. In the preferred embodiment the bolt 133 is replaced by the end of the hydraulic coupling 33 threaded into the housing 36.

Normally the fluid used for control is air. The tractor is provided with a compressor and air reserve tank which maintains a pressure adequate to operate any air brakes and the control system.

As shown in FIG. 6, the hydraulic system comprises a number of fluid connection lines running from a reserve surge tank 75. Should there be an electrical failure or a drop of pressure in the main air reserve normally closed failure switch 66 opens causing a series of shutdown actions. A fail-safe check valve 74 closes, along with the other normally open check valve 72. This traps fluid in the system dash pots 32 at enough pressure to allow for fail-safe staged control shutdown. The surge tank 75 can be used like the dash pots 32, in which case this is considered a fluid chamber which causes retraction of the cylinder when the check valve 74 is closed. In this alternative not shown, the check valve 74 would be located above the reservoir 75, and both valves 72 and preferably 73 would close.

When check valve 74 closes it drops engaging bar operation pressure by opening the cylinder advance two way control valve 76 to exhaust 77 as well as coupling cylinder retraction two way control valve 78 to pressure. Normally these are in the engagement position shown in FIG. 6 due to the action of solenoid 67. However on shutdown, these valves being spring biased by the spring bias of solenoid 67, these valves move to the fail-safe mode, causing the remaining pressure in dash pots 32 to be used to retract the piston. Such a reaction will turn off the green operating light as the piston retracts and disconnects switch 63.

Many of the features of the alternate preferred embodiment are common to the preferred embodiment and the alternate preferred embodiment, as well as the modified embodiment. These features have generally been given the same number and will not be separately discussed in redundant detail, however, some common important features will be discussed.

The trailer is normally supplied with fluid to drive cylinder 36 by air lines 53 which pass through a distribution valve box 54 (some lines will pass to the brake system) and from there to the anti-jackknifing control system carried by support frame 23. From the box 54 the line (or lines) are distributed to the cylinder and other fluid devices by lines 55. The cylinder and dash pot control valves are preferably housed in a fluid distribution control box 56 from which they pass via fluid lines 58 (not shown in FIGS. 2A, 3A) to their controlled chambers (32 and 63) as shown in FIG. 6.

In the alternate embodiment the dash pot pressure centering control is not used, but springs 32a bias the limit element 28 to a centered position. These springs have not been employed in the preferred embodiment, but, while redundant, they might be added. Similarly, in the alternate and modified embodiment, a spring 60 biases the piston 62 to the retracted position, as does first embodiment's auxilary spring 60 assist the preferred use of fluid pressure.

In the alternate embodiment shown in FIGS. 2A and 3A adjustment means for setting the limit of end of lateral travel of the shaft 30 are provided by threaded bolt 133 having a head 34 and lock nut 35. The traverse shaft member 30 carries a ball 31 mounted within housing 36 which has a bracket for securement to the threaded member 38. The member 38 serves to mount the adjustable threaded bolt 133 on the frame.

In all embodiments the rear of the cylinder is pivotally mounted on the frame 23 by a vertically pivotal connector 40. In the preferred embodiments this connector has a semi-universal connection 40 which allows the cylinder to move laterally as well as vertically, along with the lateral movement of the abutment link 28. The abutment is movable along with the cylinder as illustrated by the broken lines in FIG. 3 so as to prove support for the abutment in positions which are laterally adjustable to vary the angular relationship between the tractor and trailer.

FIG. 7 is a modified section of the shaft housing 36 showing one half of the engaging bar shaft 30 and engaging bar limit member 28 in accodance with the best mode of this bar limit member 28 in accodance with the best mode of this feature as illustrated like a section taken along line 4—4 of FIG. 3. In this embodiment the wall of the engaging bar shaft housing 36 has inserted in the bore thereof a bushing 140 into which the shaft 30 is journaled for rotational and sliding movement. A snap ring 141 maintains the bushing in place. The shaft is not required to fit with a fluid seal to the sides of the bushing 140, and a small clearance is provided to ease movement and minimize maintainence. The position of the shaft is controlled by the position of the piston 142 (one in each of the dash pot fail safe chambers 32 located at either end of the shaft) which is provided with two O-rings 143 providing a fluid seal for dash pot 32. When the shaft contacts the piston 142 a contact switch (not shown here) pole is closed activating a warning signal. At the outer end of the dash pot fail safe chamber 32 is an O-ring 144 sealed end plug 145 held in place by a snap ring 146, as shown, or by a threaded adjustment nipple (not shown). The plug is provided with a threaded fitting aperature 146, and bleed aperature 147 having a fitting receptacle 148. As will be understood, the end of the shaft 30 is shown abutting the piston 142. However, the bushing is approximately 3.5 in. long, and the shaft may slide freely to the left so that its illustrated end is away from the piston 142 by a distance of about 1.34 in. before its other end contracts the piston (not shown) in the housing at the other end. Thereafter, if the engaging bar 28 is driven by the ear of the fifth wheel engagment it will move the piston and compress the fluid in the dash pot fail safe chamber 32, expressing fluid through the bleed aperature 148 and/or the aperature 146 until it reaches the end plug. This distance of travel is approximately 2 and 3/16 in. less the amount of the spacing of the end plug, a distance which will maintain the end of the shaft within the bushing at the other end of the shaft housing due to the axial dimensions of the piston and end plug.

It will be understood that the axis of the shaft is aligned to lie within 2-3 inches of and parallel to the mounting bar which places the apparatus against the beam of the trailer's frame. This close mounting places the shaft directly above the center of the V-slot, and provides maximum leverage for the engaging bar which itself is about 2 inches wide when it is moved into the V-slot engagement zone. It will be understood that the use of the bushing, piston and end plug allow (as well as any adjustment nipple if needed, allow an installer to vary the extent of lateral slide of the shaft to a specific amount, and thereby to permit the free swing of the vehicles to be limited to 12-16 degrees (the amount of slide of the shaft before it reaches the piston) and the controlled arc to be limited to the amount of the limited free swing arc plus an additional 10-14 degrees (the controlled arc is determined by the amount of piston slide) simply by replacing one or more of these three elements with others that have different axial dimensions. The fluid pressure system is used to stop the axial movement of the piston and control its position (and thus the controlled arc) as in the above described system.

When the fluid pressure in dash pot 32 is such as to hold the piston to the left, as it is when the engagement bar is engaged and during its movement into the V-slot, the piston causes the limit member 28 to be centered in a neutral position between the ends of its permissible travel. Because in the embodiment shown in FIG. 7 allows some free play, the member's movement in the vertical direction may cause engagement with the side of the V-slot, but this will only cause the shaft to slide slightly to permit the member to be fully positioned. The bar member centering may be aided by springs as shown in FIG. 3A.

If the limit member is engaged at a loading dock in a position in which the bar member 28 comes down outside of the V-slot, due to a sharp articulation turn of the vehicle, when the tractor moves forward the slide plate will either lift the limit member up above it until it slides above the V-slot (as it will with most of the V-slot slide plates used on tractors today) or cause the shaft to contact the piston and sound a warning signal to the driver.

FIG. 8 illustrated a modified embodiment of the invention which does not have the laterally movable and preferred features of the inventions illustrated by FIGS. 2 and 2A. In this embodiment, the abutment element 128 is aligned vertically in relation to the longitudinal position of the frame and is carried by a slide 50 which is pivotally connected as at 51 to the forward end of the extensible piston rod member 26. The slide in this modified embodiment is provided with anti-friction means 53 to assure ease of movement within a V-shaped groove 52 which is complementary to the V-shaped grooved sides 53 of the slide. This arrangement assures solid lateral support for the abutment 126 which projects downwardly from the slide 50, but does not allow lateral movement. The controls in such a system are along the lines of FIGS. 1-7 however the lateral movement controls are eliminated and the abutment member is moved into place only when needed to control the lateral movement of the abutment link 28 are eliminated. Instead, the switch 71 closes check valve 73' like valves 72 and 73 to lock fluid in the rear of the chamber 63. In this embodiment the jackknifing movement will urge the abutment element 128 rearwardly upon contact with the ears. This movement is retarded by the forward pressure in the rear of the cylinder 36. Rearward movement is retarded and stopped by the switch 71 which checks further compression of the cylinder fluid. This arrangement allows some lateral movement, but the systems described in the preferred embodiment provides greater flexibility of control.

The various valves illustrated in the drawings to explain the function of the hydraulic control may be combined into multi-function valves located in the distribution box 56. Similarly, the electrical controls may be altered by those skilled in the art to perform the described functions by different elements; however, the preferred described elements provide the control capability with simple, reliable and effective means. As shown in FIG. 6, the dash pot 32 can be alternatively supplied with hydraulic fluid 160 through supply means 161, to lock hydraulic fluid in the dash pot in leiu of air normally used in the rest of the fluid system.

Indeed, after review of the foregoing detailed disclosure of the preferred embodiments, as well as the alternate and modified embodiment, those skilled in the art will appreciate that further changes including modifications, rearrangements and alterations described elements may be made, both now and in the future, without departing from the spirit and scope of the following claims.

What is claimed is:

1. An anti-jackknifing apparatus for use in connection with a coupling between a tractor having a fifth wheel with a coupling plate member having a longitudinal slot having a tapered diverging opening defining two spaced ear portions extending rearwardly carried on said fifth wheel of the tractor, and a trailer having a forward frame portion and a connector pin adapted for coupling to said fifth wheel, said apparatus comprising:

a support frame;
said support frame having a transverse forward frame mounting bar secured adjacent a forward end of said support frame for securement to said forward frame portion on said trailer in superposed relation to said slot and to thereby position the apparatus when mounted on said trailer against said forward frame portion and under the trailer in such a position as to locate the forward position of abutment means carried by said support frame;
position control means including abutment means having an abutment stop member, a fluid operated cylinder, lateral support means are adjustable limit means carried by said support frame,
said fluid operated cylinder having an extensible member extending forwardly from one end thereof;
means for securing said fluid operated cylinder within said support frame;
said abutment means being coupled to said cylinder for movement of said abutment stop member between a first position extending into an engagement zone between the spaced ear portions of said slot and a second position wherein movement of said extensible element moves the said abutment stop member out of said engagement zone; and
said lateral support member means being carried within said support frame having a fixed relation thereto and providing lateral support for said abutment means when in said first position where said abutment stop member of said abutment means is normally positioned to arrest relative angular jackknifing movement of said tractor and trailer while permitting limited relative angular back and forth swinging movement therebetween about said connector pin coupling to said fifth wheel when in said first position extending into said engagement zone;
said abutment stop member being mounted for contacting one of the ear portions of said slot of said fifth wheel upon swinging movement and to be driven by said one ear portion and moved from an initial ear-slot-stop member engagement position to another ear-slot-stop member engagement position displaced in the engagement zone plane defined by the ear portions of said fifth wheel where further movement of said tractor and trailer about said connector pin coupling in the direction of swinging is prevented,
said adjustable limit means carried by said position control means for allowing a swinging movement after initial ear-slot-stop member initial contact up to a limit of movement of said abutment stop member where further relative angular swinging movement of said tractor and trailer about said coupling in a swinging direction is prevented by said abutment stop member and said adjustable limit means, and allowing a reverse relative angular swinging movement up to a limit determined by said adjustable limit means.

2. The structure set forth in claim 1 including means for said fluid operated cylinder for moving said abutment stop member from said first position to said second position should fluid pressure fail.

3. The structure set forth in claim 1 including a switch means for activation when said abutment stop member is moved when in said first position to a predetermined position by engagement with one of said ear portions of said fifth wheel, and an alarm means is provided for energization in response to activation of said switch means.

4. The structure set forth in claim 1 wherein said abutment means when in said first position is carried in a position in which said abutment stop member is normally positioned in said slot between said ear portions, and wherein centering means is provided for moving said abutment stop member into a neutral centered position in the slot of the fifth wheel during the course of movement of said abutment stop member into said first position.

5. The structure set forth in claim 1 wherein said abutment means is carried by said lateral support means on a transversely movable shaft member journaled in a lateral support means housing of said support means carried by said support frame for lateral sliding movement within said housing, and said lateral support means and said adjustable limit means act to limit said lateral sliding movement of said shaft member to a desired limit of free sliding movement to thereby fix the amount or permissible angular swing or said trailer relative to said tractor.

6. The structure according to claim 5 wherein said lateral support means carries said abutment means and allows said abutment means to pivot upwardly to said second position and downwardly to said first position in a vertical place between said second and first positions.

7. The structure set forth in claim 1 wherein abutment means when in said first position is carried in said slot between said ear portions and said support means includes a longitudinal guide within said longitudinal frame carrying said abutment means.

8. The structure set forth in claim 7 wherein said longitudinal guide includes a pair of opposed V-shaped guides and a slide therein carrying said abutment means.

9. Anti-jackknifing apparatus according to claim 1 wherein said lateral support means includes a lateral support housing and a laterally movable shaft member journaled in said lateral support housing for lateral movement therein, and a fluid chamber in said support housing into and against which said shaft moves when said shaft moves laterally, and wherein said shaft may rotate after said shaft has moved laterally a distance to move out of abutment with said fifth wheel.

10. Anti-jackknifing apparatus according to claim 9 wherein said shaft housing means includes adjustable lateral limit means to fix a desired lateral limit of free sliding movement of said shaft to thereby fix the amount of permissible angular swing of said trailer relative to said tractor by stopping the lateral movement of the shaft and the abutment limit element and thereby arresting further angular trailer movement when the limit element is unable to move further in the lateral direction due to the then stationary adjustable lateral limit means and slot of said fifth wheel.

11. Anti-jackknifing apparatus according to claim 1 wherein said lateral support means includes a lateral support housing and a laterally movable shaft member journaled in said lateral support housing for lateral movement therein, and a fluid chamber in said support housing into and against which said shaft moves when said shaft moves laterally, and wherein said shaft may rotate after said shaft has moved laterally a distance to move out of abutment with said fifth wheel.

12. An anti-jackknifing apparatus for use in connection with a tractor trailer coupling wherein said tractor carries a fifth wheel for coupling to a trailer mounted coupling pin to permit the tractor to pull said trailer and wherein said apparatus comprises:

a fluid operated cylinder mounted on a base support member mounted on said trailer, said cylinder having an extensible member having a driven outer end extending forwardly from one end thereof;

cylinder mounting means on said base support member for permitting pivotal movement in a vertical plane as well as lateral movement in a lateral plane on said base support member;

abutment means coupled to the said driven outer end of said extensible member having an abutment stop member having one end adapted for movement into and out of an engagement zone between spaced ears of a longitudinal slot in said fifth wheel, which abutment means is carried on a transversely extending shaft member journaled in support means so as to permit lateral sliding movement of said abutment stop member in a transverse direction as well as pivotal movement of said abutment stop member upon shaft rotation; and said extensible member having a pivotal connection at the drive end thereof with said abutment means whereby linear movement of said extensible member from said cylinder causes the rotation of said shaft and movement of an abutment end of said abutment stop member into and out of said engagement zone.

13. The structure set forth in claim 12 including adjustable limit means in said support means for arresting movement of opposed ends of said shaft member as it slides laterally in said support means.

14. Anti-jackknifing apparatus according to claim 12 wherein said support means includes a lateral support housing and a laterally movable shaft member journaled in said lateral support housing for lateral movement therein, and a fluid chamber in said support housing into and against which said shaft moves when said shaft moves laterally, and wherein said shaft may rotate after said shaft has moved laterally a distance to move out of abutment with said fifth wheel.

15. An anti-jackknifing apparatus for use in connection with a coupling of a tractor and trailer, said tractor having a fifth wheel with a longitudinal outwardly tapering slot therein and said trailer having a frame thereunder, comprising:

elongated abutment means having a limit element pivotally movable in a vertical plane between a first position where it is adapted to extend when mounted on said trailer into an intercept zone located within said tapering slot and a second position retracted from and above said slot;

a transverse shaft member journaled in shaft housing means supported by said frame beneath the trailer with said shaft member being transversely movable within its journal mounting after engagement with said fifth wheel; said abutment limit element being mounted on said transverse shaft member; and a fluid operated actuation cylinder having extensible means with pivotal connection to said abutment means at a point on said abutment means remote from said transverse shaft member; said cylinder having reciprocal movement means coupled to said extensible means for pivoting said abutment element between said first and second positions.

16. The structure set forth in claim 15 including means for pivoting said abutment limit element from said first to said second position should fluid pressure in said cylinder fail to cause retraction of said abutment limit member from said intercept zone.

17. The structure set forth in claim 16 wherein said means for pivoting includes spring means carried within said cylinder for closing said extensible means in the event of fluid pressure failure.

18. The structure set forth in claim 15 including a switch adapted to be activated when said abutment limit element is about in a position to avoid a jackknifing occurrence to cause operation of alarm means as a feedback of angular position of said trailer, and wherein said switch has a contact positioned a spaced distance from an end limit of permissible lateral movement of said transverse shaft member in one direction in said shaft housing means so as to be contacted and activated by said shaft as said shaft moves laterally toward said end limit to lateral movement of said shaft to provide a feedback signal of the limit element's lateral position prior to a point when said limit element will stop lateral movement and rotation of said trailer relative to said tractor.

19. Anti-jackknifing apparatus according to claim 15 wherein said elongated abutment means, said transverse shaft member, said shaft housing means, and said fluid operated actuation cylinder are surrounded, protected and carried by support frame means which is mounted on said trailer frame, and wherein
said cylinder and said abutment means are supported within said support frame so as to avoid damage thereto when said abutment means is in said first position limiting the tractor and trailer against relative movement to avoid jackknifing when said abutment means is extending into said engagement zone and when the abutment means is out of said engagement zone.

20. Anti-jackknifing apparatus according to claim 19 wherein said limit means is adjustable and limits the extent of lateral movement of said abutment means in said fluid chamber and said adjustable limit means is adapted to stop further lateral movement of said abutment means depending upon the setting of said adjustable limit means.

21. Anti-jackknifing apparatus according to claim 15 wherein the amount of lateral movement of said transverse shaft member in said shaft housing means is limited by adjustable limit stop means.

22. Anti-jackknifing apparatus according to claim 15 wherein said shaft housing means includes a lateral support housing having a closed end and a laterally movable shaft member journaled in an open end of said lateral support housing for lateral movement therein, and a fluid chamber in said support housing into and against which said shaft moves when said shaft moves laterally toward said closed end, and wherein said shaft may rotate after said shaft has moved laterally a distance to move out of abutment with said fifth wheel.

23. Anti-jackknifing apparatus according to claim 15 wherein said abutment means is carried by said transverse shaft member and journaled in shaft housing means which allows said abutment means to pivot upwardly and downwardly from a second to a first position and centering means is provided to center the abutment means in a neutral position intermediate the limits of lateral shaft movement in said shaft housing means while said abutment means is moving downwardly in the vertical plane.

24. Anti-jackknifing apparatus according to claim 15 wherein the amount of lateral movement of said transverse shaft member in said shaft housing means is limited by adjustable limit means, and
wherein said abutment means is carried by said transverse shaft member journaled in shaft housing means for allowing said abutment limit element to pivotally rotate upwardly and downwardly from a second to a first position and centering means are provided to center the abutment means in a neutral position intermediate the limits of lateral shaft movement in said shaft housing means while said abutment limit element is moving downwardly in the vertical plane.

25. An anti-jackknifing apparatus for use in connection with a coupling between a tractor having a fifth wheel with a coupling member having a longitudinal slot having a tapered diverging opening defining two spaced ear portions extending rearwardly carried thereon and a trailer having a forward frame portion, said apparatus comprising:
support frame means;
abutment means; and
position control means coupled to said abutment means,
said support frame having mounting means for securing said support frame to said trailer;
said abutment means being carried by said support frame and being coupled to said position control means for movement between a first position extending into an engagement zone which intersects a plane lying between the spaced ear portions of said slot and a second position wherein the abutment means is retracted out of said engagement zone; and
support means, carried by said support frame having a fixed relation thereto, for providing support for said abutment means when in said first position; said support means allowing displacement movement of said abutment means by driving engagement of said ears of said fifth wheel slot and said abutment means from an initial first position of said abutment means in said plane to a displaced first position of said abutment means in said plane to permit additional relative swinging movement of said tractor and trailer after said driving engagement of said abutment means by said ears; and
said position control means being drivingly coupled to said abutment means for moving said abutment means to said first position while allowing movement of said abutment means in said first position, and to retract said abutment means to said second position, and
limit means for limiting movement of said abutment means while it is in said first position and after it has been engaged by one of said ears of said fifth wheel to arrest relative swinging movement between the tractor and trailer.

26. Anti-jackknifing apparatus according to claim 25, wherein said support means includes a lateral support housing having a fluid chamber into which a laterally movable member of said abutment means is journaled for lateral movement; and wherein lateral movement of said member in said fluid chamber is limited by said limit means.

27. Anti-jackknifing apparatus according to claim 25 wherein said shaft may rotate after said shaft has moved laterally a distance to move said abutment means out of abutment with said fifth wheel.

28. Anti-jackknifing apparatus according to claim 25 wherein said limit means is adjustable to adjust the permissible movement of said abutment means in said plane.

29. Anti-jackknifing apparatus according to claim 25 wherein said support frame includes a support mounting bar adapted to be connected to said trailer and to position said abutment means in superposed relation to said slot.

30. Anti-jackknifing apparatus according to claim 25 wherein said support housing includes a lateral support housing having a closed end and said movable member is a shaft journaled in an open end of said lateral support housing for lateral movement therein, and there is provided a fluid chamber in said support housing against which said shaft moves when said shaft moves laterally toward said closed end, and wherein said abutment means is coupled to said control means for rotation of said shaft after said shaft has moved laterally a distance to move an abutment member of said abutment means out of abutment with said fifth wheel.

31. Anti-jackknifing apparatus according to claim 30 wherein there is provided a switch means activated when said abutment means has been displaced by ear engagement from said initial first position to cause operation of alarm means as a feedback of angular position of said trailer and permit activation of said control means to retract said abutment means from said first position.

32. Anti-jackknifing apparatus according to claim 30 wherein there is provided a switch activated by a contact closed when the shaft is a spaced distance from the limit of permissible lateral movement of said transverse shaft member in one direction in said shaft housing means so as to be activated by said shaft as said shaft moves laterally toward a limit to lateral movement of said shaft to provide a feedback signal of the limit element s lateral position prior to a point when said limit means will stop lateral movement and rotation of said trailer relative to said tractor about the tractor trailer coupling.

33. An anti-jackknifing apparatus according to claim 15 wherein said position control means include centering means which causes said abutment means to move to an initial neutral first position between the ears of said fifth wheel as said abutment means is moved to said first initial neutral position by said position control means, and
said abutment means is coupled to said position control means to allow movement from said initial neutral position to another position by driving engagement with the ears of said fifth wheel up to a limit position restricting swinging movement about said coupling.

34. Anti-jackknifing apparatus according to claim 33 wherein said support means includes bias means which allows said abutment means to pivot upwardly to said second position and downwardly to said first position in a vertical plane and acts to bias the abutment means to said neutral position while said abutment means is moving in the vertical plane intermediate the limits of movement of said abutment means from said initial first position to said limit position.

35. Anti-jackknifing apparatus according to claim 33 wherein said abutment means includes an abutment member which is adapted to extend downwardly in said first position and a shaft connected to and supporting said abutment member, said shaft being journaled for rotation in shaft housing means at both ends and being slideable in both lateral directions in said shaft housing means, and said bias means biases said shaft to a neutral position between ends of permissible lateral movement of said shaft in the shaft housing means.

36. An anti-jackknifing apparatus for use in connection with a coupling between a tractor having a fifth wheel with a coupling member having a longitudinal slot having a tapered diverging opening defining two spaced ear portions extending rearwardly carried thereon and a trailer having a forward frame portion, said apparatus comprising:
support frame means;
abutment means; and
position control means coupled to said abutment means,
said support frame having mounting means for securing said support frame to said trailer;
said abutment means being carried by said support frame and being coupled to said position control means for movement between a first position extending into an engagement zone which intersects a plane lying between the spaced ear portions of said slot and a second position wherein the abutment means is retracted out of said engagement zone; and
support means, carried by said support frame having a fixed relation thereof, for providing support for said abutment means when in said first position; said support means allowing engagement of said abutment means by said ears of said fifth wheel slot after said abutment means is positioned in an initial neutral first position of said abutment means in said plane;
said position control means being drivingly coupled to said abutment means for moving said abutment means to said first position while allowing limited swinging movement of said tractor and trailer when said abutment means are in said first position, and to retract said abutment means to said second position,
said abutment means being coupled to said position control means for allowing limited relative movement of said tractor and trailer in a swinging direction after engagement of said abutment means by an ear of said fifth wheel, and
adjustable limit means for limiting movement of said abutment means while said abutment means is in said first position after said abutment means has been engaged by one of said ears of said fifth wheel; said adjustable limit means determining the degree of permissible relative swinging movement between the tractor and trailer.

37. Anti-jackknifing apparatus according to claim 36 wherein said abutment means is carried by lateral support means on a tranversely movable shaft member journaled in a lateral support means housing of said support means carried by said support frame means so as to permit lateral sliding movement of said shaft member within said housing, and said lateral support means includes said adjustable limit means to limit said lateral sliding movement of said shaft member to a desired limit of free sliding movement to thereby fix the amount of permissible angular swing of said trailer relative to said tractor.

38. An anti-jackknifing apparatus according to claim 36 wherein said position control means includes centering means which causes said abutment means to move to said initial neutral first position between the ears of said fifth wheel as said abutment means is moved to said first initial neutral position by said position control means, and said abutment means is coupled to said position control means to allow movement from said initial neutral position to another position by driving engagement with the ears of said fifth wheel up to a limit position restricting swinging movement about said coupling.

39. Anti-jackknifing apparatus according to claim 36 wherein said support means includes bias means which allows said abutment means to pivot upwardly to said second position and downwardly to said first position in a vertical plane and acts to bias the abutment means to said neutral position, while said abutment means is moving in the vertical plane, intermediate the limits of movement of said abutment means from said initial first position to said limit position.

40. Anti-jackknifing apparatus according to claim 36 wherein said abutment means includes an abutment member which is adapted to extend downwardly in said first position and a shaft connected to and supporting said abutment member, said shaft being journaled for rotation in shaft housing means at both ends and being slideable in both lateral directions in said shaft housing means, and said bias means biases said shaft to a neutral position between ends of permissible lateral movement of said shaft in the shaft housing means.

41. Anti-jackknifing apparatus according to claim 36 wherein said support means includes a lateral support housing having a fluid chamber into which a laterally movable member of said abutment means is journaled for lateral movement; and wherein lateral movement of said member in said fluid chamber is limited by said limit means.

42. Anti-jackknifing apparatus according to claim 36 wherein said shaft may rotate after said shaft has moved laterally a distance to move said abutment means out of abutment with said fifth wheel.

43. Anti-jackknifing apparatus according to claim 36 wherein said support frame includes a support counting bar adapted to be connected to said trailer and to position said abutment means in superposed relation to said slot.

44. Anti-jackknifing apparatus according to claim 36 wherein said support housing includes a lateral support housing having a closed end and said movable member is a shaft journaled in an open end of said lateral support housing for lateral movement therein, and there is provided a fluid chamber in said support housing against which said shaft moves when said shaft moves laterally toward said closed end, and wherein said abutment means is coupled to said control means for rotation of said shaft after said shaft has moved laterally a distance to move an abutment member of said abutment means out of abutment with said fifth wheel.

45. Anti-jackknifing apparatus according to claim 36 wherein there is provided a switch activated by a contact closed when the shaft is a spaced distance from the limit of permissible lateral movement of said transverse shaft member in one direction in said shaft housing means so as to be activated by said shaft as said shaft moves laterally toward a limit of lateral movement of said shaft to provide a feedback signal of the limit element s lateral position prior to a point when said limit means will stop lateral movement and rotation of said trailer relative to said tractor about the tractor trailer coupling.

46. Anti-jackknifing apparatus according to claim 36 wherein there is provided a switch means adapted to be activated when said abutment means has been displaced by ear engagement from said initial first position to cause operation of alarm means as a feedback of angular position of said trailer and permit activation of said control means to retract said abutment means from said first position.

47. An anti-jackknifing apparatus for use in connection with a coupling between a tractor having a fifth wheel with a coupling member having a longitudinal slot having a tapered diverging opening defining two spaced ear portions extending rearwardly carried thereon and a trailer having a forward frame portion, said apparatus comprising:

support frame means;
abutment means; and
position control means coupled to said abutment means,
said support frame having mounting means for securing said support frame to said trailer;
said abutment means being carried by said support frame and being coupled to said position control means for movement between a first position extending into an engagement zone which intersects a plane lying between the spaced ear portions of said slot and a second position wherein the abutment means is retracted out of said engagement zone; and
support means, carried by said support frame having a fixed relation thereto, for providing support for said abutment means when in said first position; said support means allowing engagement of said abutment means by said ears of said fifth wheel slot after said abutment means is positioned in an initial neutral first position of said abutment means in said plane;
said position control means being drivingly coupled to said abutment means for moving said abutment means to said first position while allowing movement of said abutment means in said first position, and to retract said abutment means to said second position, and wherein
said position control means include centering means for causing said abutment means to move to said initial neutral first position between the ears of said fifth wheel as said abutment means is moved to said first initial neutral position by said position control means, and
said abutment means is coupled to said position control means for allowing movement from said initial neutral position to another position by driving engagement with the ears of said fifth wheel up to a limit position restricting swinging movement about said coupling, and wherein is included
limit means for limiting relative swinging movement of said tractor and trailer while said abutment means is in said first position and after said abutment means has been engaged by one of said ears of said fifth wheel to arrest relative swinging movement between the tractor and trailer.

48. Anti-jackknifing apparatus according to claim 47 wherein said support means includes bias means which allows said abutment means to pivot upwardly to said second position and downwardly to said first position in a vertical plane and acts to bias the abutment means to said neutral position while said abutment means is moving in the vertical plane intermediate the limits of movement of said abutment means from said initial first position to said limit position.

49. Anti-jackknifing apparatus according to claim 47 wherein said abutment means includes an abutment member which is adapted to extend downwardly in said first position and a shaft connected to and supporting said abutment member, said shaft being journaled for rotation in shaft housing means at both ends and being slideable in both lateral directions in said shaft housing means, and said bias means biases said shaft to a neutral position between ends of permissible lateral movement of said shaft in the shaft housing means.

50. An anti-jackknifing apparatus for use in connection with a coupling of a tractor having a fifth wheel with a longitudinal outwardly tapering slot therein and a trailer having a frame thereunder, comprising:

elongated abutment means having limit element pivotally movable in a vertical plane for movement between a first position where said limit element is adapted to extend when mounted on said trailer into an intercept zone located beneath said abutment means to a first position located within said tapering slot and a second position retracted from within said slot;

a transverse shaft member mounting said abutment for pivotal movement into and out of said intercept zone journaled in shaft housing means supported by said frame beneath the trailer; and actuation means coupled to said shaft member for moving said transverse shaft member to cause pivoting of said abutment element between said first and second positions, and said limit element of said abutment means when stopped in position arrests relative rotational movement of said tractor and trailer about said coupling.

51. An anti-jackknifing apparatus according to claim 50 wherein said shaft housing means includes a lateral support housing having a fluid chamber into which said laterally movable shaft member is journaled for lateral movement into and against which said shaft moves when said shaft moves laterally, and wherein said shaft may rotate after said shaft has moved laterally a distance to move out of abutment with said fifth wheel.

* * * * *

UNITED STATES PATENT AND TRADEMARK OFFICE
CERTIFICATE OF CORRECTION

PATENT NO. : 4,700,966

DATED : October 20, 1987

INVENTOR(S) : Hawkins, et al

It is certified that error appears in the above-identified patent and that said Letters Patent is hereby corrected as shown below:

Column 3, line 23, "reciptocation" should read --reciprocation--.

Column 3, line 50, "sever" should read --severe--.

Column 14, line 17, "are" should read --and--.

Signed and Sealed this

Twenty-fourth Day of January, 1989

Attest:

DONALD J. QUIGG

*Attesting Officer*     *Commissioner of Patents and Trademarks*